United States Patent Office.

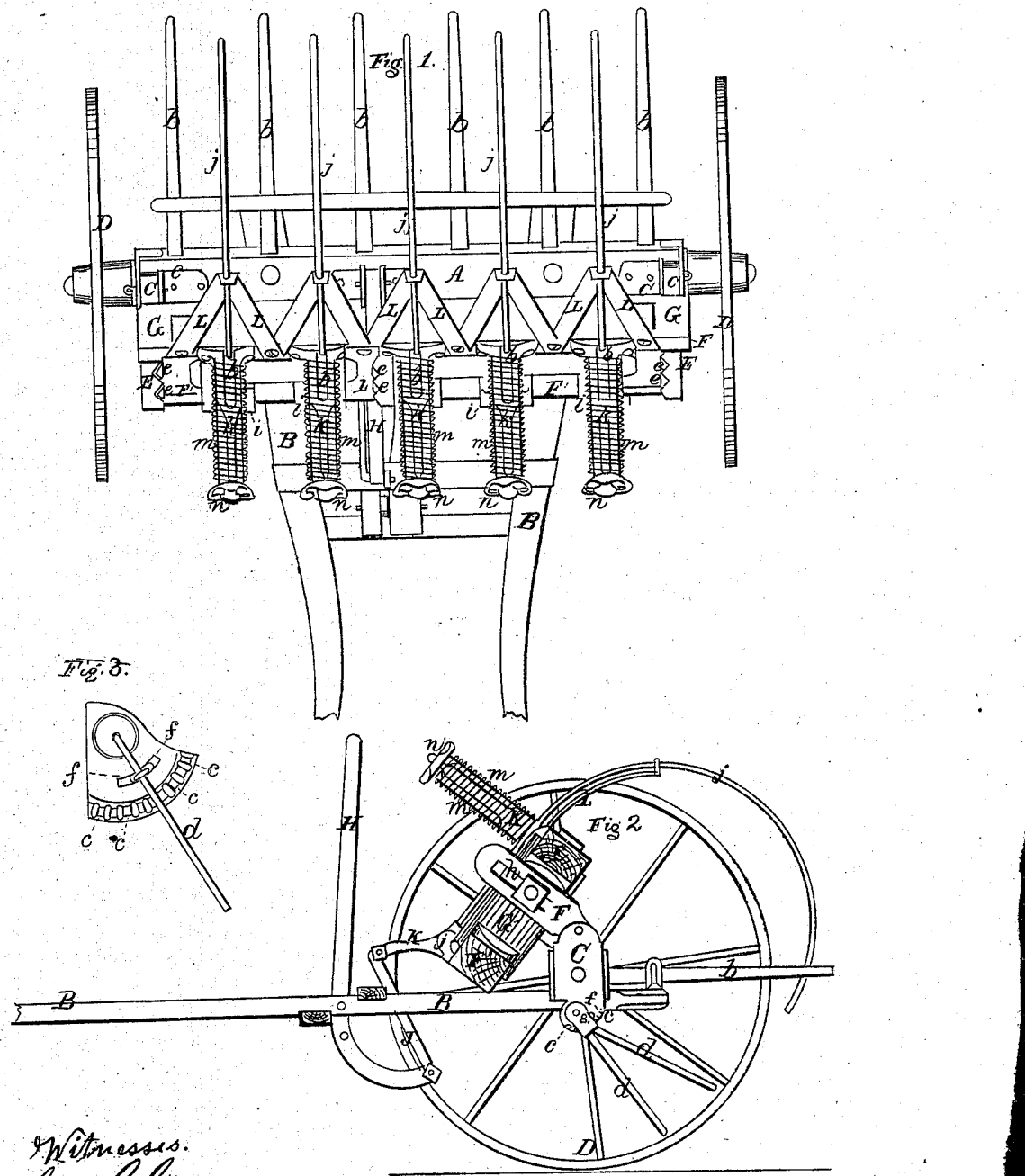

MARTIN C. REMINGTON, OF WEEDSPORT, NEW YORK.

Letters Patent No. 95,268, dated September 28, 1869.

---

IMPROVEMENT IN HORSE HAY-RAKES.

---

The Schedule referred to in these Letters Patent and making part of the same.

---

*To all whom it may concern:*

Be it known that I, MARTIN C. REMINGTON, of Weedsport, in the county of Cayuga, and State of New York, have invented certain new and useful Improvements in Horse Hay-Rakes; and the following is a full, clear, and exact description of the same, reference being had to the accompanying drawings, making a part of this specification, in which—

Figure 1 represents a plan or top view of the rake, showing the yielding, yet stiff side-braces of the curved rake-teeth or gathering-fingers, the adjustable spiral-spring holders, and the liberating-fingers.

Figure 2 shows a side-view elevation of the same, in section, with the tilting-lever and mechanism for discharging the hay in windrows.

Figure 3 is a detached side view of a single-arm adjustable guard, to keep the gathered hay from getting in against and clogging up the wheels.

The object and nature of my invention is—

First, to prevent the hay, as it is being gathered, from pressing against the wheels, and getting in between the spokes, and wound around the axle, to clog up the implement.

Second, the mode of constructing the rake-teeth fastenings, so that they may be easily adjusted to any required tension of spring, for raking green or dry hay; also, more convenient for taking out and replacing when broken.

Third, in the manner of forming the spring-braces to support the curved rake-teeth sidewise, and give them the much-needed lateral support a considerable distance from the head.

Fourth, the construction of the rake-head and the adjustable vertical coupling-bar hinges, for changing the height of the head and position of the teeth.

To enable others to make and use my improvements in horse hay-rakes, I will describe them more fully, referring to the drawings, and to the letters of reference marked thereon.

My improvements are upon the kind known as buggy or two-wheel horse hay-rakes, the whole apparatus being mounted and nearly balanced over the axle-tree A.

The thills or shafts B B are bolted to the under side, and extend back from the axle-tree A a sufficient distance to support the cleaners or liberating-fingers *b b b* in a direct line with the shafts B B, in the rear.

On both ends of the axle-tree are fitted metal cap-flanges C C, to which the rake-head is attached and hinged on the top.

The flanges C C extend down, and are so constructed as to provide for attaching adjustable flexible guards *d d*, to prevent the hay, while being gathered in windrows, to come in contact with and clog up the wheels D D.

The guard-flanges C C are made right and left, of malleable cast-iron, with a segment of a circle, provided with notches *c c c c* on the outsides, in which a double or a single guard-finger, *d*, as seen in fig. 3, is held, so that it may be placed at any desired angle, and secured in position by a bolt, *g*, and nut, the bolt passing through a curved slot, *f*, made for the purpose.

To the top ends of the cap-flanges C C are pivoted the standards E E, on which the rake-head F' F is mounted.

The end-pieces of the rake-head G G, and also the standards E E, are made of malleable cast-iron, they being provided with notches *e e*, to fit each other, and a slot, *h*, bolt, and nut, to hold them, so that the height of the rake-head may be adjusted to accommodate the kind of hay being gathered.

The curved rake-teeth, or gathering-fingers *j j j*, are bent at right angles at the rear end, and are held in clamp-sockets *i i i*, screwed to the front bar F', of the rake-head.

On the rear bar F are mounted standards *k k k*, they having a long opening, *l*, above their foot or base, through which the gathering-fingers pass.

The standards *k k k* are surrounded by helical springs *m m m*, and are held to operate on the fingers *j j j* by buttons *n n n*, so notched as to be secure when on, and very easily removed to take out and replace the fingers, should they be broken, to which they are very liable.

To the rear bar F of the rake-head are also secured oblique spring-braces I I I I, which extend back to the middle, or half the length of the curved rake-teeth or gathering-fingers *j j j*, to support them sidewise, which is a matter of very great importance to horse hay-rakes, where steel wire or rods are used for the gathering-fingers.

The lateral braces I I I I may be made of sheet spring-steel, cut in strips of any desired width, or of hoop-iron, hammered to make it springy, or of hard drawn wire, bent in a proper form.

The whole rake or gathering-apparatus, being balanced over the axle, is very free to be operated by the hand-lever H, which may be placed convenient to the driver's seat; the lever being connected with a coupling-bar, J, to an arm, K, attached to the rake-head F', which may, if necessary on account of the length and weight of the apparatus, be supported between the ends, by one or more of the standards E.

The advantages of my improvements are obvious to every practical man who has and uses horse hay-rakes, and do not require to be further expatiated upon.

What I claim as my invention, and desire to secure by Letters Patent, is—

1. The adjustable guards, consisting of one or more fingers, *d d*, as arranged and combined with the cap-flanges C C, substantially as and for the purposes herein specified.

2. The combination and arrangement of the cap-flanges C C, constructed as described, notched standards E E, and the end cross-pieces G G, for adjusting the height of the rake-head F, as herein described.

3. The combination of the oblique braces I I, gathering-fingers or rake-teeth *j*, slotted standard *k*, spring *m*, and top-button *n*, as and for the purposes herein set forth.

In testimony whereof, I hereunto subscribe my name, in the presence of—

MARTIN C. REMINGTON.

Witnesses:
 HENRY R. FILLEY,
 CLARENCE D. BRADLEY.